US012114242B2

(12) United States Patent
Mou et al.

(10) Patent No.: US 12,114,242 B2
(45) Date of Patent: Oct. 8, 2024

(54) ACCESSORY DEVICE, HOST DEVICE, AND DATA TRANSMISSION METHOD

(71) Applicant: Huawei Technologies Co., Ltd., Shenzhen (CN)

(72) Inventors: Yang Mou, Dongguan (CN); Xiaofei Zhong, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 17/664,289

(22) Filed: May 20, 2022

(65) Prior Publication Data
US 2022/0279328 A1 Sep. 1, 2022

Related U.S. Application Data

(63) Continuation of application No. PCT/CN2020/128725, filed on Nov. 13, 2020.

(30) Foreign Application Priority Data

Nov. 22, 2019 (CN) .......................... 201911159401.0

(51) Int. Cl.
H04W 4/80 (2018.01)
H04W 76/14 (2018.01)
(52) U.S. Cl.
CPC ............. *H04W 4/80* (2018.02); *H04W 76/14* (2018.02)
(58) Field of Classification Search
CPC ........ H04W 4/80; H04W 76/14; H04W 88/02
See application file for complete search history.

(56) References Cited

U.S. PATENT DOCUMENTS

2013/0005250 A1  1/2013 Kim et al.
2014/0062677 A1  3/2014 Kakuda
(Continued)

FOREIGN PATENT DOCUMENTS

CN   103687061    *  3/2014  ............ H04W 76/02
CN   103687061 A     3/2014
(Continued)

OTHER PUBLICATIONS

Al-Sarawi, S. et al., "Internet of Things (IoT) Communication Protocols: Review," 8th International Conference on Information Technology (ICIT), Jul. 2017, pp. 685-690.
(Continued)

Primary Examiner — Tuan H Nguyen
(74) Attorney, Agent, or Firm — Slater Matsil, LLP

(57) ABSTRACT

This application relates to an accessory device used for at least one first device. The accessory device includes: a transceiver unit, configured to: communicate with the at least one first device, and obtain device information of the at least one first device; and a control unit, configured to: write the device information of the at least one first device obtained by the transceiver unit into a near field communication storage medium; and when an NFC connection is established between the accessory device and a second device, control the transceiver unit to send the device information of the first device to the second device. In this application, the NFC storage medium in the accessory device is readable and writable. The accessory device communicates with different first devices according to user requirements, and obtains device information of the different first devices.

20 Claims, 8 Drawing Sheets

(56) References Cited

U.S. PATENT DOCUMENTS

2014/0244723 A1     8/2014    Gong et al.
2014/0297896 A1    10/2014    Yang

FOREIGN PATENT DOCUMENTS

| CN | 103716675 | * | 4/2014 | ........... H04N 21/422 |
|---|---|---|---|---|
| CN | 103716675 A | | 4/2014 | |
| CN | 204681378 U | | 9/2015 | |
| CN | 105407450 A | | 3/2016 | |
| CN | 105516903 A | | 4/2016 | |
| CN | 106657158 A | | 5/2017 | |
| CN | 107197420 A | | 9/2017 | |
| CN | 107769881 A | | 3/2018 | |
| CN | 108337555 A | | 7/2018 | |
| CN | 110996307 A | | 4/2020 | |
| EP | 2521372 A1 | | 11/2012 | |
| WO | 2016165083 A1 | | 10/2016 | |
| WO | 2017035062 A1 | | 3/2017 | |
| WO | 2019074260 A1 | | 4/2019 | |

OTHER PUBLICATIONS

Jie, M. et al., "Research on Fast Establishing Bluetooth Secure Connection with NFC Technology", Computer Applications and Software, Mar. 2013, 7 pages.

* cited by examiner

ACCESSORY DEVICE, HOST DEVICE, AND DATA TRANSMISSION METHOD

CROSS-REFERENCE TO RELATED APPLICATIONS

This application is a continuation of International Patent Application No. PCT/CN2020/128725, filed on Nov. 13, 2020, which claims priority to Chinese Patent Application No. 201911159401.0, filed on Nov. 22, 2019. The disclosures of the aforementioned applications are hereby incorporated by reference in their entireties.

TECHNICAL FIELD

One or more embodiments of this application generally relate to the field of communications technologies, and specifically, to an accessory device, a host device, and a data transmission method.

BACKGROUND

Near field communication (NFC) is a short-range wireless connection technology based on radio frequency identification (RFID).

In recent years, NFC is increasingly applied to interconnection and communication between devices due to convenience of the NFC. In the conventional technology, a media access control (MAC) address of a device is usually burned in an NFC tag before delivery, and the NFC tag is posted outside the body of the device. When interconnection and communication are required, another device may approach the NFC tag, obtain the MAC address in the NFC tag through NFC communication, and establish a communication connection to the device posted with the NFC tag.

SUMMARY

The following describes this application from a plurality of aspects. For the following implementations and beneficial effects of the plurality of aspects, refer to each other.

According to a first aspect, an embodiment of this application provides an accessory device used for at least one first device. The accessory device and the at least one first device are disposed separately in space. The accessory device includes: a transceiver unit, configured to: communicate with the at least one first device, and obtain device information of the at least one first device; and a control unit, configured to: write the device information of the at least one first device obtained by the transceiver unit into a near field communication (NFC) storage medium; and when an NFC connection is established between the accessory device and a second device, control the transceiver unit to send the device information of the first device to the second device. The first device may be a host device, for example but not limited to, a tablet computer or a television. The accessory device may be, for example but not limited to, a keyboard or a remote control. The second device may be a terminal device, for example but not limited to, a mobile phone. The device information of the first device may be used to establish a communication connection between the second device and the first device.

According to embodiments of this application, the NFC storage medium in the accessory device is readable and writable. The accessory device may communicate with different first devices according to user requirements, and obtain device information of the different first devices. This can help a user manage and use device information of a plurality of first devices by using the accessory device, and greatly improve user experience.

According to embodiments of this application, the first device sends the device information of the first device to the accessory device that is disposed separately from the first device in space. In this way, when the second device is relatively far away from the first device and is relatively close to the accessory device (for example, the accessory device has relatively high mobility), the second device may obtain the device information of the first device by using the accessory device. This can extend a distance for the second device to obtain the device information of the first device, and can also improve user experience.

In some embodiments, when the at least one first device includes a plurality of first devices, the control unit is further configured to: establish a one-to-one correspondence between device information of the plurality of first devices and shortcut keys of the accessory device, and control, based on shortcut key selection made by a user, the transceiver unit to send device information of a first device corresponding to a shortcut key selected by the user to the second device.

According to embodiments of this application, the device information of the first devices is in the one-to-one correspondence with the shortcut keys of the accessory device, so that the user can select device information of different first devices.

In some embodiments, that the transceiver unit is configured to: communicate with the at least one first device, and obtain device information of the at least one first device includes: sending a media access control (MAC) address of the accessory device to the at least one first device in a first communication mode; and sending at least one of a device name and a device serial number of the accessory device to the at least one first device in a second communication mode, and receiving the device information from the at least one first device.

According to embodiments of this application, the two communication modes are used between the first device and the accessory device, so that communication security can be improved.

In some embodiments, the first communication mode includes a wireless charging communication mode or an NFC communication mode, and the second communication mode includes a Bluetooth communication mode.

According to embodiments of this application, the accessory device sends information about the accessory device to the first device in a short-distance communication mode such as the wireless charging communication mode or the NFC communication mode, to trigger a long-distance communication mode between the first device and the accessory device. In this way, a communication distance between the first device and the accessory device can be extended, and the first device and the accessory device do not need to be limited to a short-distance communication range. In addition, the wireless charging communication mode is used between the accessory device and the first device, so that the first device can charge the accessory device, and communication between the accessory device and the first device can also be implemented.

In some embodiments, the first communication mode or the second communication mode includes at least one of wireless charging communication, Bluetooth communication, cellular mobile communication, wireless fidelity (Wi-Fi) communication, universal serial bus (USB) connection-based communication, Pogopin connection-based communication, and NFC communication.

In some embodiments, the accessory device further includes an amplification circuit, configured to amplify an electrical signal of the control unit that indicates the device information of the first device, so that the transceiver unit sends the amplified electrical signal to the second device.

According to embodiments of this application, the amplification circuit amplifies the electrical signal that indicates the device information of the first device, so that an NFC communication distance between the accessory device and the second device can be extended.

In some embodiments, the control unit is further configured to: encrypt the device information of the at least one first device obtained by the transceiver unit, and write encrypted device information of the at least one first device into the NFC storage medium. The encryption may mean calculating a hash value of the device information of the first device by using a hash algorithm.

According to embodiments of this application, the device information of the first device is encrypted, so that the second device can receive accurate information of the first device that is not tampered with.

In some embodiments, the device information of the first device includes at least one of a MAC address and a device serial number.

A second aspect of this application provides a first device. The first device and an accessory device used for the first device are disposed separately in space. The first device includes: a transceiver unit, configured to communicate with the accessory device; and a control unit, configured to send device information of the first device to the accessory device. The device information of the first device is used to establish communication between the first device and a second device. The first device may be a host device, for example but not limited to, a tablet computer or a television. The accessory device may be, for example but not limited to, a keyboard or a remote control. The second device may be a terminal device, for example but not limited to, a mobile phone. The device information of the first device may be used to establish a communication connection between the second device and the first device.

According to embodiments of this application, the first device sends the device information of the first device to the accessory device that is disposed separately from the first device in space. In this way, when the second device is relatively far away from the first device and is relatively close to the accessory device (for example, the accessory device has relatively high mobility), the second device may obtain the device information of the first device by using the accessory device. This can extend a distance for the second device to obtain the device information of the first device, and can also improve user experience.

In some embodiments, that the transceiver unit is configured to communicate with the accessory device includes: receiving a MAC address of the accessory device from the accessory device in a first communication mode; enabling a second communication mode in response to receiving the MAC address of the accessory device; and receiving at least one of a device name and a device serial number from the accessory device in the second communication mode.

According to embodiments of this application, the two communication modes are used between the first device and the accessory device, so that communication security can be improved. Further, the MAC address of the accessory device is received in the first communication mode, to trigger the first device to enable the second communication mode, so that various operations required by a user to manually enable the second communication mode of the first device can be avoided.

In some embodiments, that the transceiver unit is configured to communicate with the accessory device further includes: when the MAC address of the accessory device received in the first communication mode is at least partially the same as that of the accessory device received in the second communication mode, sending the device information of the first device to the accessory device in the second communication mode.

In some embodiments, the first communication mode includes a wireless charging communication mode or an NFC communication mode, and the second communication mode includes a Bluetooth communication mode.

According to embodiments of this application, the accessory device sends information about the accessory device to the first device in a short-distance communication mode such as the wireless charging communication mode or the NFC communication mode, to trigger a long-distance communication mode between the first device and the accessory device. In this way, a communication distance between the first device and the accessory device can be extended, and the first device and the accessory device do not need to be limited to a short-distance communication range. In addition, the wireless charging communication mode is used between the accessory device and the first device, so that the first device can charge the accessory device, and communication between the accessory device and the first device can also be implemented.

In some embodiments, the first communication mode or the second communication mode includes at least one of wireless charging communication, Bluetooth communication, cellular mobile communication, Wi-Fi communication, USB connection-based communication, Pogopin connection-based communication, and NFC communication.

In some embodiments, the device information of the first device includes at least one of a MAC address and a device serial number.

A third aspect of this application provides a data transmission system, including any accessory device described above and any first device described above.

A fourth aspect of this application provides a data transmission method for an accessory device. The accessory device is used for at least one first device. The accessory device and the at least one first device are disposed separately in space. The method includes: communicating with the at least one first device, and obtaining device information of the at least one first device; writing the obtained device information of the at least one first device into a near field communication (NFC) storage medium in the accessory device; and when an NFC connection is established between the accessory device and a second device, sending the device information of the first device to the second device.

According to embodiments of this application, the NFC storage medium in the accessory device is readable and writable. The accessory device may communicate with different first devices according to user requirements, and obtain device information of the different first devices. This can help a user manage and use device information of a plurality of first devices by using the accessory device, and greatly improve user experience.

According to embodiments of this application, the first device sends the device information of the first device to the accessory device that is disposed separately from the first device in space. In this way, when the second device is relatively far away from the first device and is relatively close to the accessory device (for example, the accessory device has relatively high mobility), the second device may obtain the device information of the first device by using the accessory device. This can extend a distance for the second device to obtain the device information of the first device, and can also improve user experience.

In some embodiments, when the at least one first device includes a plurality of first devices, the method further includes: establishing a one-to-one correspondence between device information of the plurality of first devices and shortcut keys of the accessory device, where the device information of the first device that is sent to the second device is device information of a first device corresponding to a shortcut key selected by a user.

According to embodiments of this application, the device information of the first devices is in the one-to-one correspondence with the shortcut keys of the accessory device, so that the user can select device information of different first devices.

In some embodiments, the communicating with the at least one first device, and obtaining device information of the at least one first device includes: sending a MAC address of the accessory device to the at least one first device in a first communication mode; and sending at least one of a device name and a device serial number of the accessory device to the at least one first device in a second communication mode, and receiving the device information from the at least one first device.

According to embodiments of this application, the two communication modes are used between the first device and the accessory device, so that communication security can be improved.

In some embodiments, the first communication mode includes a wireless charging communication mode or an NFC communication mode, and the second communication mode includes a Bluetooth communication mode.

According to embodiments of this application, the accessory device sends information about the accessory device to the first device in a short-distance communication mode such as the wireless charging communication mode or the NFC communication mode, to trigger a long-distance communication mode between the first device and the accessory device. In this way, a communication distance between the first device and the accessory device can be extended, and the first device and the accessory device do not need to be limited to a short-distance communication range. In addition, the wireless charging communication mode is used between the accessory device and the first device, so that the first device can charge the accessory device, and communication between the accessory device and the first device can also be implemented.

In some embodiments, the first communication mode or the second communication mode includes at least one of wireless charging communication, Bluetooth communication, cellular mobile communication, Wi-Fi communication, USB connection-based communication, Pogopin connection-based communication, and NFC communication.

In some embodiments, the method further includes: amplifying an electrical signal that indicates the device information of the first device that is to be sent to the second device.

According to embodiments of this application, the amplification circuit amplifies the electrical signal that indicates the device information of the first device, so that an NFC communication distance between the accessory device and the second device can be extended.

In some embodiments, the method further includes: encrypting the device information of the at least one first device that is to be written into the NFC storage medium. The encryption may mean calculating a hash value of the device information of the first device by using a hash algorithm.

According to embodiments of this application, the device information of the first device is encrypted, so that the second device can receive accurate information of the first device that is not tampered with.

In some embodiments, the device information of the first device includes at least one of a MAC address and a device serial number.

A fifth aspect of this application provides a data transmission method for a first device. The first device and an accessory device used for the first device are disposed separately in space. The method includes: sending device information of the first device to the accessory device. The device information of the first device is used to establish communication between the first device and a second device.

According to embodiments of this application, the first device sends the device information of the first device to the accessory device that is disposed separately from the first device in space. In this way, when the second device is relatively far away from the first device and is relatively close to the accessory device (for example, the accessory device has relatively high mobility), the second device may obtain the device information of the first device by using the accessory device. This can extend a distance for the second device to obtain the device information of the first device, and can also improve user experience.

In some embodiments, the method further includes: receiving a MAC address of the accessory device from the accessory device in a first communication mode; enabling a second communication mode in response to receiving the MAC address of the accessory device; and receiving at least one of a device name and a device serial number from the accessory device in the second communication mode.

According to embodiments of this application, the two communication modes are used between the first device and the accessory device, so that communication security can be improved. Further, the MAC address of the accessory device is received in the first communication mode, to trigger the first device to enable the second communication mode, so that various operations required by a user to manually enable the second communication mode of the first device can be avoided.

In some embodiments, when the MAC address of the accessory device received in the first communication mode is at least partially the same as that of the accessory device received in the second communication mode, the device information of the first device is sent to the accessory device in the second communication mode.

In some embodiments, the first communication mode includes a wireless charging communication mode or an NFC communication mode, and the second communication mode includes a Bluetooth communication mode.

According to embodiments of this application, the accessory device sends information about the accessory device to the first device in a short-distance communication mode such as the wireless charging communication mode or the NFC communication mode, to trigger a long-distance communication mode between the first device and the accessory device. In this way, a communication distance between the first device and the accessory device can be extended, and the first device and the accessory device do not need to be limited to a short-distance communication range. In addition, the wireless charging communication mode is used between the accessory device and the first device, so that the first device can charge the accessory device, and communication between the accessory device and the first device can also be implemented.

In some embodiments, the first communication mode or the second communication mode includes at least one of wireless charging communication, Bluetooth communication, cellular mobile communication, Wi-Fi communication, USB connection-based communication, Pogopin connection-based communication, and NFC communication.

In some embodiments, the device information of the first device includes at least one of a MAC address and a device serial number.

A sixth aspect of this application provides a computer-readable storage medium. The computer-readable storage medium stores instructions, and when the instructions are run on a machine, the machine is enabled to perform any data transmission method described above.

A seventh aspect of this application provides a data transmission apparatus. The apparatus includes a processor and a memory. The memory stores instructions, and when the instructions are run by the processor, the processor is enabled to perform any data transmission method described above.

DETAILED DESCRIPTION OF ILLUSTRATIVE EMBODIMENTS

Figure 1:
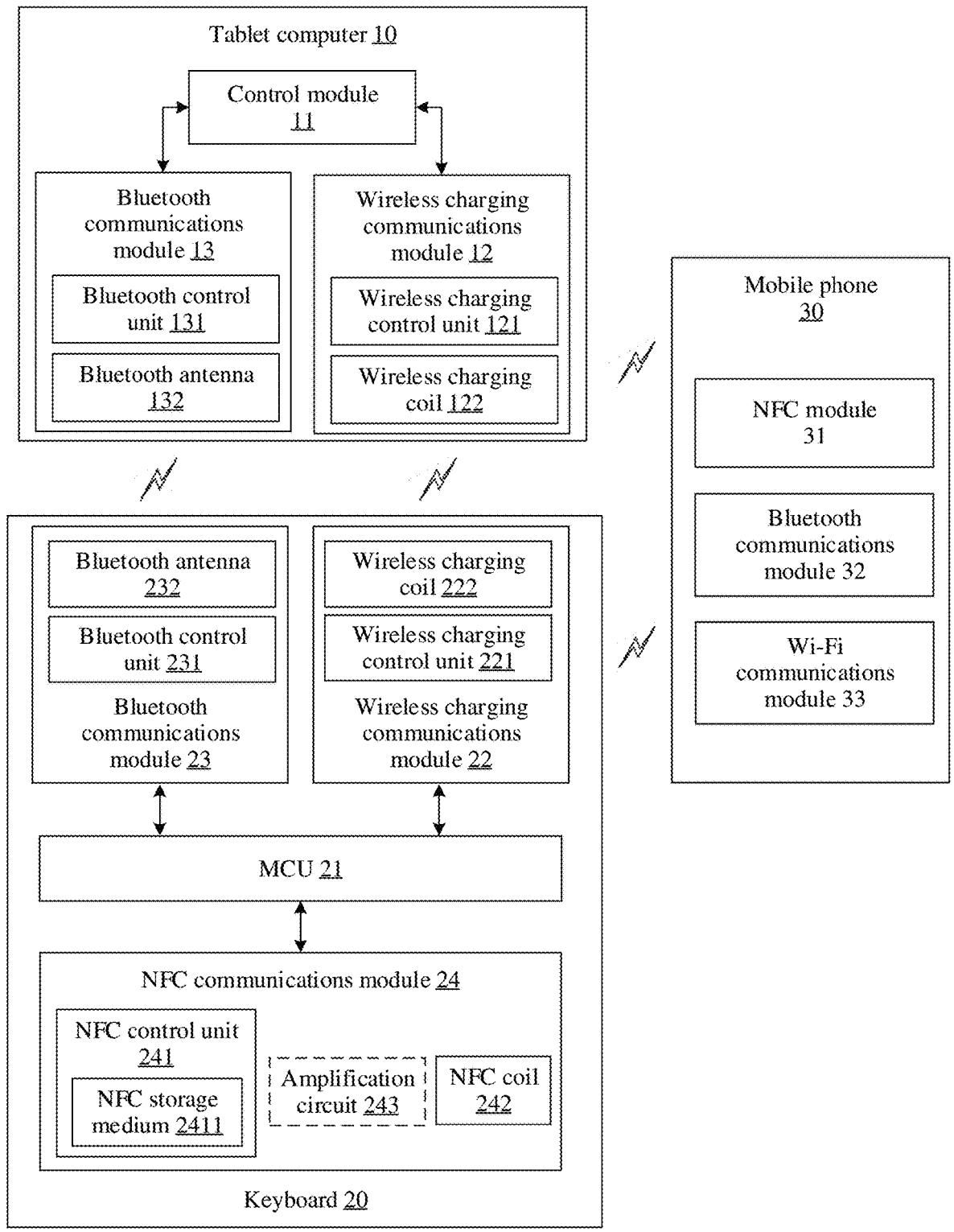
FIG. 1 shows structures of a tablet computer, a keyboard, and a mobile phone and a scenario of data transmission between the tablet computer, the keyboard, and the mobile phone according to an embodiment of this application.

The following further describes this application with reference to specific embodiments and the accompanying drawings. Specific embodiments described herein are merely intended to explain this application, but not to limit this application. In addition, for ease of description, the accompanying drawings show only some but not all structures or processes related to this application. It should be noted that, in this specification, reference numerals and letters in the following accompanying drawings represent similar items. Therefore, once an item is defined in an accompanying drawing, the item does not need to be further defined or interpreted in subsequent accompanying drawings.

FIG. 1 shows structures of a tablet computer 10, a keyboard 20, and a mobile phone 30 and a scenario of data transmission between the tablet computer 10, the keyboard 20, and the mobile phone 30 according to an embodiment of this application. According to some embodiments of this application, although the tablet computer 10 and the keyboard 20 are disposed separately in space in FIG. 1, the tablet computer 10 and the keyboard 20 may be sold together, or may be sold separately. According to some embodiments of this application, the tablet computer 10 may establish a communication connection to the keyboard 20, and send device information (for example but not limited to a MAC address, a device serial number (SN), or other device information) of the tablet computer 10 to the keyboard 20; the keyboard 20 may write the device information of the tablet computer 10 into an NFC storage medium, and when an NFC connection is established between the keyboard 20 and the mobile phone 30, send the device information of the tablet computer 10 to the mobile phone 30; and the mobile phone 30 may establish a communication connection to the tablet computer 10 based on the device information of the tablet computer 10, for example but not limited to, a Bluetooth connection, a Wi-Fi connection, or another communication connection.

As shown in FIG. 1, the tablet computer 10 may include but is not limited to a control module 11, a wireless charging communications module 12, and a Bluetooth communications module 13. The wireless charging communications module 12 includes a wireless charging control unit 121 and a wireless charging coil 122. The Bluetooth communications module 13 includes a Bluetooth control unit 131 and a Bluetooth antenna 132. According to some embodiments of this application, the control module 11 in the tablet computer 10 may control, for example but not limited to, communication between the keyboard 20 and each of the wireless charging communications module 12 and the Bluetooth communications module 13, communication between the Bluetooth communications module 13 and the mobile phone 30, communication between the tablet computer 10 and another communications module, and interaction between the tablet computer 10 and a user.

As shown in FIG. 1, the keyboard 20 may include but is not limited to a microcontroller unit (MCU) 21, a wireless charging communications module 22, a Bluetooth communications module 23, and an NFC communications module 24. The wireless charging communications module 22 may include a wireless charging control unit 221 and a wireless charging coil 222. The Bluetooth communications module 23 may include a Bluetooth control unit 231 and a Bluetooth antenna 232. The NFC communications module 24 may include an NFC control unit 241, an amplification circuit 243, and an NFC coil 242. The NFC control unit 241 may include an NFC storage medium 2411, and the amplification circuit 243 is optional. According to some embodiments of this application, the MCU 21 in the keyboard 20 may control, for example but not limited to, communication between the tablet computer 10 and each of the wireless charging communications module 22 and the Bluetooth communications module 23, communication between the NFC communications module 24 and the mobile phone 30, and communication between the keyboard 20 and another communications module.

As shown in FIG. 1, the mobile phone 30 may include an NFC communications module 31, a Bluetooth communications module 32, and a Wi-Fi communications module 33. According to some embodiments of this application, the NFC communications module 31 is configured to: perform NFC communication with the keyboard 20, and obtain the device information of the tablet computer 10, for example, at least one of a Bluetooth MAC address and the device SN; the Bluetooth communications module 32 may establish a Bluetooth connection to the tablet computer 10 based on the device information of the tablet computer 10; and the Wi-Fi communications module 33 may establish a Wi-Fi connection to the tablet computer 10 based on the established Bluetooth connection to the tablet computer 10. For example, if the device information of the tablet computer 10 includes the Bluetooth MAC address, the Bluetooth communications module 32 may initiate a Bluetooth connection request to the tablet computer 10 based on the Bluetooth MAC address of the tablet computer 10. For example, if the device information of the tablet computer 10 includes the device SN, the mobile phone 30 may determine the Bluetooth MAC address of the tablet computer 10 based on a stored correspondence between a device SN and a Bluetooth MAC address, and initiate a Bluetooth connection request to the tablet computer 10 by using the Bluetooth communications module 32.

The following further describes the tablet computer 10 and the keyboard 20 based on the examples in FIG. 1.

1. Tablet Computer 10

According to some embodiments of this application, in response to that the wireless charging module 12 receives a Bluetooth MAC address of the keyboard 20 from the keyboard 20 through wireless charging communication, the tablet computer 10 may enable a Bluetooth function of the tablet computer 10, and send the device information of the tablet computer 10 to the keyboard 20 based on a Bluetooth connection to the keyboard 20.

Specifically, when resonance frequencies of the wireless charging coil 122 in the tablet computer 10 and the wireless charging coil 222 in the keyboard 20 are the same, and when the tablet computer 10 and the keyboard 20 mutually approach (for example but not limited to, touch), the wireless charging coil 122 in the tablet computer 10 and the wireless charging coil 222 in the keyboard 20 may exchange energy based on a magnetic resonance effect. Therefore, the wireless charging control unit 121 in the tablet computer 10 may control the wireless charging coil 122 to perform wireless communication with the keyboard 20, and may also control the wireless charging coil 122 to wirelessly charge the keyboard 20 based on the magnetic resonance effect.

The wireless charging control unit 121 may include but is not limited to a capacitor, a direct current power, an inverter, a demodulator, a charging electricity diverter switch, and the like that are configured to enable the wireless charging coil 122 to be in a resonant state. The inverter may convert a direct current into an alternating current. The charging electricity diverter switch may be configured to adjust wireless charging power. The demodulator may demodulate a signal from the keyboard 20.

The wireless charging control unit 121 may control the wireless charging coil 122 to send a pulse signal. The pulse signal may be used by the tablet computer 10 to determine whether there is a keyboard that can be connected or needs to be charged.

The wireless charging coil 122 may receive an acknowledgment signal from the keyboard 20. The acknowledgment signal may include the Bluetooth MAC address of the keyboard 20, and may further include configuration information related to charging power.

In response to receiving the acknowledgment signal, the wireless charging control unit 121 may send a keyboard connection message to the control module 11. The keyboard connection message includes the Bluetooth MAC address of the keyboard 20. The control module 11 may control to enable the Bluetooth function of the tablet computer, and send a scanning indication message to the Bluetooth control unit 131. The scanning indication message indicates the Bluetooth control unit 131 to perform Bluetooth broadcast message scanning through the Bluetooth antenna 132.

The Bluetooth antenna 132 may receive Bluetooth broadcast messages from one or more broadcast devices. The one or more broadcast devices include the keyboard 20, and the Bluetooth broadcast messages each may include one or more of a device name, a device SN, and a Bluetooth MAC address of the broadcast device, and a Bluetooth protocol related indication such as a Bluetooth GATT service related indication.

When the Bluetooth broadcast messages each include the Bluetooth MAC address of the broadcast device, the control module 11 may compare the Bluetooth MAC addresses in the one or more Bluetooth broadcast messages with the Bluetooth MAC address received through the wireless charging coil 122, to determine a Bluetooth broadcast message of the keyboard 20 that performs wireless charging communication with the tablet computer 10.

The control module 11 may further determine, based on device information such as one or more of a device name, a device SN, and the Bluetooth MAC address of the keyboard 20 in the Bluetooth broadcast message of the keyboard 20 that performs wireless charging communication with the tablet computer 10, whether the keyboard 20 is trusted. In an example, the control module 11 may compare the device information of the keyboard 20 with trusted device information stored in the tablet computer 10, and determine whether the device information of the keyboard 20 is included in the trusted device information. The trusted device information includes information about a trusted device of the tablet computer 10. The trusted device information may be information received from a server or another information source, or may be information burned when the tablet computer 10 is delivered from a factory, or may be information about a device that has communicated with the tablet computer 10. A source of the trusted device information is not limited herein. In another example, the control module 11 may control the interaction between the tablet computer 10 and the user, to be specific, display the device information of the keyboard 20 to the user, and determine, based on a user input, whether the keyboard 20 is trusted.

When determining that the keyboard 20 that performs wireless charging communication with the tablet computer 10 is trusted, for example, when determining that the device information of the keyboard 20 is included in the trusted device information or the user input indicates that the keyboard 20 is trusted, the control module 11 may control, by using the Bluetooth control unit 131, the Bluetooth antenna 132 to send, according to a Bluetooth protocol such as a Bluetooth GATT service indicated by the keyboard 20 that performs wireless charging communication with the tablet computer 10 in the Bluetooth broadcast message, the device information of the tablet computer 10 such as at least one of the MAC address and the device SN to the keyboard 20 that performs wireless charging communication with the tablet computer 10. The device SN may be but is not limited to a device SN randomly generated by the control module 11, and the random device SN can improve security of communication between the tablet computer 10 and the mobile phone 30.

In another embodiment, Bluetooth broadcast messages received by the Bluetooth antenna 132 from one or more devices each may include one or more of a device name, a device SN, and a Bluetooth MAC address of the broadcast device, and a Bluetooth protocol related indication such as a Bluetooth GATT service related indication. The control module 11 may determine specific trusted broadcast devices based on device information in each Bluetooth broadcast message, for example, the one or more of the device name, the device SN, and the Bluetooth MAC address of the broadcast device. The broadcast devices include the keyboard 20 that performs wireless charging communication with the tablet computer 10.

The control module 11 may control, by using the Bluetooth control unit 131, the Bluetooth antenna 132 to send the device information of the tablet computer 10 such as at least one of the MAC address and the device SN to each trusted broadcast device according to a Bluetooth protocol such as a Bluetooth GATT service indicated by each trusted broadcast device in the Bluetooth broadcast message of the trusted broadcast device. The device SN may be but is not limited to a device SN randomly generated by the control module 11, and the random device SN can improve security of communication between the tablet computer 10 and the mobile phone 30. The trusted broadcast devices may include the keyboard 20 that performs wireless charging communication with the tablet computer 10.

It should be noted that the tablet computer 10 and the keyboard 20 perform wireless charging communication through the magnetic resonance effect in the foregoing embodiment. However, it may be understood that the tablet computer 10 and the keyboard 20 may alternatively perform wireless charging communication through electromagnetic induction.

2. Keyboard 20

According to some embodiments of this application, the keyboard 20 may first send the Bluetooth MAC address of the keyboard 20 to the tablet computer 10 through wireless charging communication by using the wireless charging module 22, and then receive the device information of the tablet computer 10 based on the Bluetooth connection to the tablet computer 10.

Specifically, when resonance frequencies of the wireless charging coil 122 in the tablet computer 10 and the wireless charging coil 222 in the keyboard 20 are the same, and when the keyboard 20 and the tablet computer 10 mutually approach (for example but not limited to, touch), the wireless charging coil 222 in the keyboard 20 and the wireless charging coil 122 in the tablet computer 10 may exchange energy based on a magnetic resonance effect. Therefore, the wireless charging control unit 221 in the keyboard 20 may control the wireless charging coil 222 to perform wireless charging communication with the tablet computer 10, and the wireless charging coil 222 may also receive power from the tablet computer 10 based on the magnetic resonance effect. The wireless charging control unit 221 may include but is not limited to a capacitor, a rectifier, a filter and voltage regulator, a modulator, and the like that are configured to enable the wireless charging coil 222 to be in a resonant state. The modulator may adjust a voltage amplitude of the wireless charging coil 222 based on to-be sent information through load modulation (for example, resistance modulation and capacitance modulation). The demodulator in the wireless charging control unit 121 in the tablet computer 10 may obtain, through demodulation based on the voltage amplitude converted based on the magnetic resonance effect, the information sent by the keyboard 20.

The wireless charging coil 222 may receive a pulse signal from the tablet computer 10. The pulse signal may be used by the tablet computer 10 to determine whether there is a keyboard that can be connected or needs to be charged.

In response to receiving the pulse signal, the wireless charging control unit 221 may control the wireless charging coil 222 to send an acknowledgment signal to the tablet computer 10. The acknowledgment signal may include the Bluetooth MAC address of the keyboard 20, or may include configuration information related to charging power. The wireless charging control unit 221 may store the Bluetooth MAC address of the keyboard 20, or may send a request to the MCU 21.

In response to that the wireless charging coil 222 sends the acknowledgment signal to the tablet computer 10, the MCU 21 may control to enable a Bluetooth function of the keyboard 20, and control, by using the Bluetooth control unit 231, the Bluetooth antenna 232 to send a Bluetooth broadcast message. The Bluetooth broadcast message is used to enable the tablet computer 10 to determine whether the keyboard 20 is trusted and determine a to-be-used Bluetooth protocol, and may include the one or more of the device name, the device SN, and the Bluetooth MAC address of the keyboard 20, and a Bluetooth protocol related indication such as a Bluetooth GATT service related indication. In another example, regardless of whether the wireless charging coil 222 sends an acknowledgment signal to the tablet computer 10, the Bluetooth antenna 232 may send a Bluetooth broadcast message.

The Bluetooth antenna 232 may receive the device information of the tablet computer 10 that is sent by the tablet computer 10 according to the Bluetooth protocol (for example, a Bluetooth GATT service), for example, the at least one of the MAC address and the device SN. In response to this, the Bluetooth control unit 231 may send the device information of the tablet computer 10 to the MCU 21, and the MCU 21 performs security processing on the device information of the tablet computer 10, for example, encrypts the device information of the tablet computer 10 by using a hash algorithm, to obtain a hash value of the device information of the tablet computer 10, so that the mobile phone 30 can determine whether the device information of the tablet computer 10 is tampered with.

The MCU 21 may send the device information of the tablet computer 10 on which security processing is performed to the NFC control unit 241, and the NFC control unit 241 writes the device information of the tablet computer 10 into the NFC storage medium 2411. For example, the NFC storage medium 2411 may include but is not limited to a random access memory (RAM) such as a dynamic random access memory (DRAM) or a static random access memory (SRAM), a flash memory, and another type of accessible storage medium.

In another example, the NFC control unit 241 may determine whether the device information of the tablet computer 10 received from the MCU 21 is the same as device information in the NFC storage medium 2411. When determining that the two pieces of device information are different, the NFC control unit 241 updates the device information in the NFC storage medium 2411 by using the device information of the tablet computer 10; or when determining that the two pieces of device information are the same, the NFC control unit 241 does not update the device information in the NFC storage medium 2411.

When the mobile phone 30 approaches (for example, touches) the keyboard 20, the NFC coil 242 may receive a radio frequency signal from the mobile phone 30 through electromagnetic induction. The radio frequency signal is used to indicate the keyboard 20 to send the device information of the tablet computer 10. In response to this, the NFC control unit 241 may control the NFC coil 242 to send the device information of the tablet computer 10 in the NFC storage medium 2411 to the mobile phone 30 through electromagnetic induction.

In another example, the amplification circuit 243 such as a low-frequency voltage amplifier (for example, a common-emitter amplification circuit or an emitter output amplification circuit), a power amplifier (for example, a class-A single-tube power amplifier or a class-B push-pull power amplifier), or a direct current amplifier (for example, a differential amplifier or an integrated operational amplifier) may amplify an electrical signal that indicates the device information of the tablet computer 10, so that the NFC coil 242 sends the amplified electrical signal to the mobile phone 30, to extend an NFC communication distance between the keyboard 20 and the mobile phone 30. The electrical signal that indicates the device information of the tablet computer 10 may be obtained based on the device information of the tablet computer 10 through load modulation.

In the embodiment, two communication modes are used between the tablet computer 10 and the keyboard 20, so that communication security can be improved. Further, in response to receiving the Bluetooth MAC address of the keyboard 20 through wireless charging communication, the Bluetooth function of the tablet computer 10 is triggered to be enabled, so that various operations required by the user to manually enable the Bluetooth function of the tablet computer 10 can be avoided. In addition, in response to sending the Bluetooth MAC address of the keyboard 20 to the tablet computer 10 through wireless charging communication, the Bluetooth function of the keyboard 20 is triggered to be enabled, so that various operations required by the user to manually enable the Bluetooth function of the keyboard 20 can be avoided. Moreover, a message from the auxiliary device 20 is received through short-distance communication such as wireless charging communication, to trigger a long-distance communication mode between the tablet computer 10 and the auxiliary device 20, so that a communication distance between the tablet computer 10 and the auxiliary device 20 can be extended, and the tablet computer 10 and the auxiliary device 20 do not need to be limited to a short-distance communication range.

It should be noted that the communications modules included in the tablet computer 10 in the embodiment is not limited to the example in FIG. 1. For example, the tablet computer 10 may include one or more of the following communications modules: a cellular mobile communications module (for example but not limited to, a 2G mobile communications module, a 3G mobile communications module, a 4G mobile communications module, and a 5G mobile communications module, which are not shown in the figure), a Wi-Fi communications module (not shown in the figure), an NFC communications module (not shown in the figure), a direct-connection communications module (not shown in the figure) (for example but not limited to, a USB communications module and a Pogopin communications module), and another type of communications module.

Herein, one or more of the control module 11, the wireless charging control unit 121, the Bluetooth control unit 131, and a control unit in another type of communications module are referred to as a control unit in the tablet computer 10. Functions of the control unit include but is not limited to controlling communication between communications modules, communication between the tablet computer 10 and the keyboard 20, communication between the tablet computer 10 and the mobile phone 30, and interaction between the tablet computer 10 and the user. One or more of the wireless charging coil 122, the Bluetooth antenna 132, and a transceiver unit in another type of communications module (for example, a transceiver unit in a cellular mobile communications module may include an antenna used for mobile communication, a transceiver unit in a Wi-Fi communications module may include an antenna used for Wi-Fi communication, and a transceiver unit in a direct-connection communications module may include a USB data cable, Pogopin, or another electronic component that physically connects the tablet computer 10 to the keyboard 20) are referred to as a transceiver unit in the tablet computer 10. Functions of the transceiver unit include but is not limited to implementing communication between the tablet computer 10 and the keyboard 20, communication between the tablet computer 10 and the mobile phone 30, or communication between the tablet computer 10 and another device.

According to some embodiments of this application, one or more components of the control unit (for example, the control module 11, the wireless charging control unit 121, the Bluetooth control unit 131, and/or another control unit) in the tablet computer 10 may include an application-specific integrated circuit (ASIC), an electronic circuit, a (shared, special-purpose, or group) processor and/or memory that executes one or more software or firmware programs, a combinational logic circuit, and/or another proper component that provides the described functions. According to one aspect, the processor may be a microprocessor, a digital signal processor, a microcontroller, or the like, and/or may be any combination thereof. According to another aspect, the processor may be a single-core processor, a multi-core processor, or the like, and/or may be any combination thereof.

It should be noted that wireless charging communication between the tablet computer 10 and the keyboard 20 may be replaced with another communication mode, Bluetooth communication may also be replaced with another communication mode, and even both wireless charging communication and Bluetooth communication may be replaced with another communication mode. The another communication mode may be a combination of one or more of cellular mobile communication, Wi-Fi communication, direct-connection communication (USB connection-based communication, Pogopin connection-based communication, or the like), NFC communication, wireless charging communication, and Bluetooth communication. In other words, the tablet computer 10 may establish a communication connection to the keyboard 20 in any proper communication mode, receive the device information of the keyboard 20 based on the communication connection, and send the device information of the tablet computer 10 to the keyboard 20 when determining, based on the device information of the keyboard 20, that the keyboard 20 is trusted. It should be noted that the communication modes include broadcast communication performed before each communication connection is established.

Figure 2:
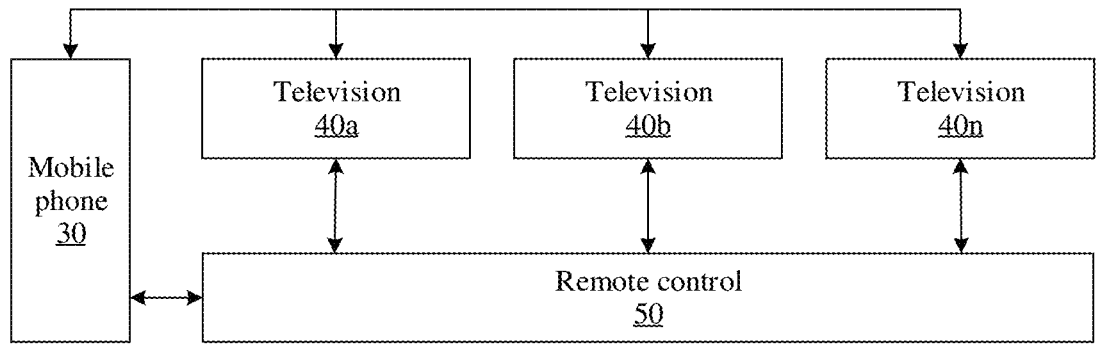
FIG. 2 is a schematic diagram of a scenario of data transmission between a plurality of televisions, a remote control, and a mobile phone according to an embodiment of this application.

FIG. 2 shows a schematic diagram of a scenario of data transmission between a plurality of televisions 40, a remote control 50, and a mobile phone 30. As shown in FIG. 2, the remote control 50 may assist in implementing functions related to the plurality of televisions 40, for example, televisions 40a, 40b, and 40n. Although the plurality of televisions 40a, 40b, and 40n and the remote control 50 are disposed separately in space in FIG. 1, one or more of the televisions 40a, 40b, and 40n and the remote control 50 may be sold together, or may be sold separately.

According to some embodiments of this application, the television 40 may include but is not limited to a module that is the same as that of the tablet computer 10 described in the foregoing embodiment, and the remote control 50 may include but is not limited to a module that is the same as that of the keyboard 20 described in the foregoing embodiment. Descriptions of the tablet computer 10 in the foregoing embodiment are also applicable to the television 40, and descriptions of the keyboard 20 in the foregoing embodiment are also applicable to the remote control 50. The remote control 50 may separately establish wireless charging communication and Bluetooth communication connections to the televisions 40a, 40b, and 40n, send device information of the remote control 50 based on the communication connections, receive device information of the televisions 40a, 40b, and 40n from the televisions 40a, 40b, and 40n, and write the device information of the televisions 40a, 40b, and 40n into an NFC storage medium of the remote control 50. For a specific process, refer to the descriptions of the tablet computer 10 and the keyboard 20 in the foregoing embodiment. Details are not described herein again.

According to some embodiments of this application, a control unit in the remote control 50 such as an MCU may establish a one-to-one correspondence between the device information of the televisions 40 and shortcut keys of the remote control 50, and control, based on shortcut key selection made by a user, a transceiver unit such as an NFC coil to send device information of a television 40 corresponding to a shortcut key selected by the user to the mobile phone 30.

Figure 3:
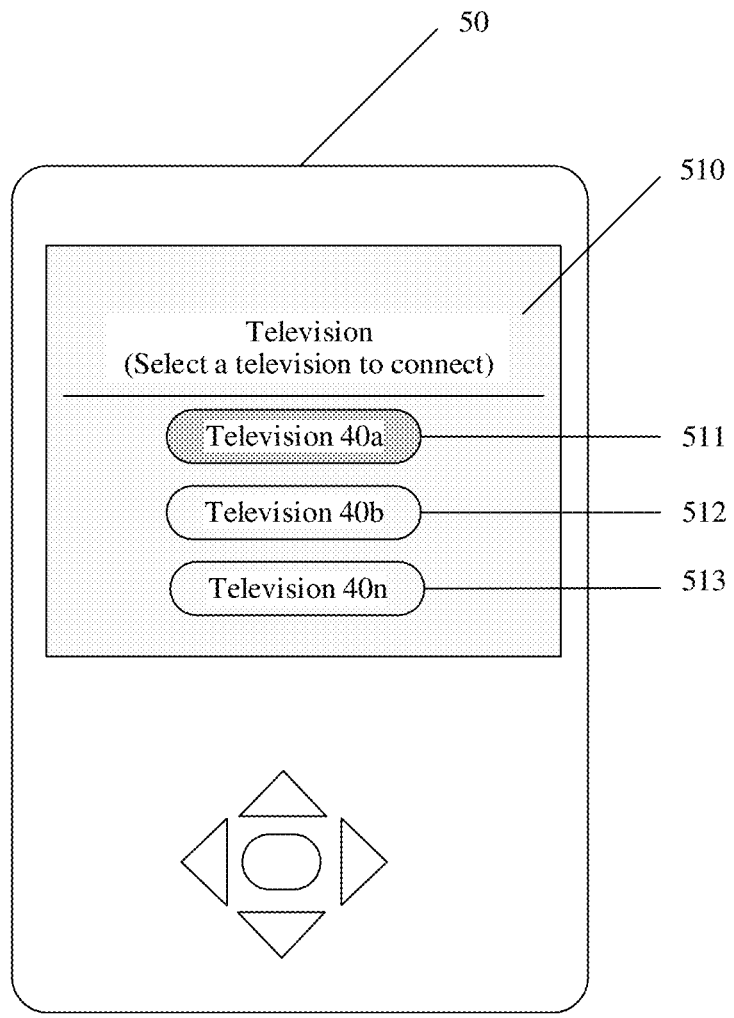
FIG. 3 is a schematic diagram of a remote control including shortcut keys according to an embodiment of this application.

FIG. 3 is a schematic diagram of the remote control 50 including shortcut keys. As shown in the figure, the remote control 50 may include a user interface 510. In response to that the NFC coil in the remote control 50 receives a radio frequency signal from the mobile phone 30, the MCU in the remote control 50 may control to display a plurality of shortcut keys on the user interface 510, for example, shortcut keys 511, 512, and 513. The shortcut keys 511, 512, and 513 may respectively indicate device names, Bluetooth MAC addresses, device SN numbers, or other device information of the televisions 40a, 40b, and 40n. As shown in FIG. 3, for example, the shortcut key 511 is selected by the user. In response to this, the MCU in the remote control 50 may control, by using an NFC control unit, the NFC coil to send the device information of the television 40a to the mobile phone 30.

Figure 4:
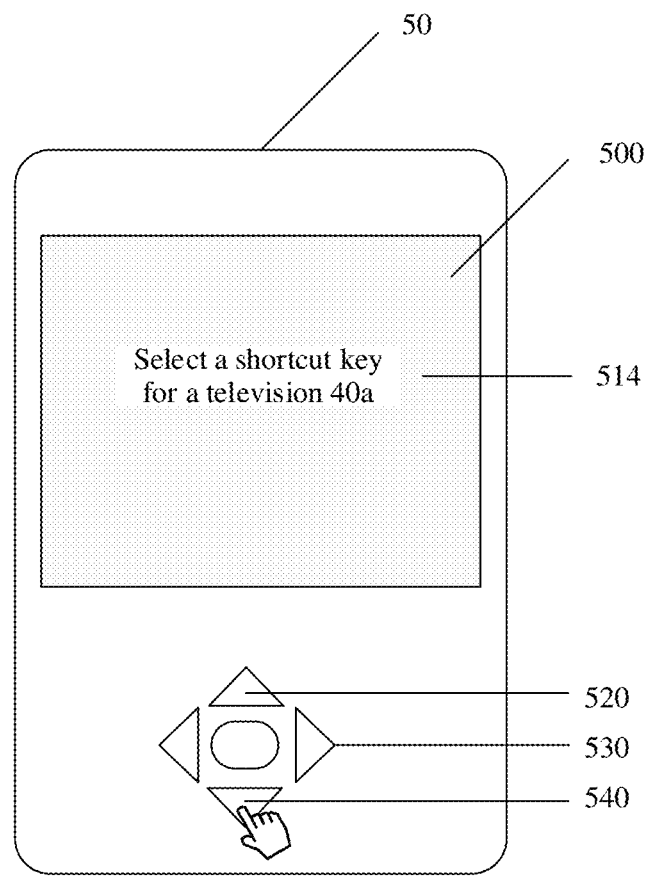
FIG. 4 is another schematic diagram of a remote control including shortcut keys according to an embodiment of this application.

In another example, as shown in FIG. 4, the remote control 50 may further include physical buttons 520 to 540. In response to that a Bluetooth antenna in the remote control 50 receives the device information from the television 40a, the MCU in the remote control 50 may control to display, on the user interface 510, an indication 514 that enables the user to select a shortcut key for the television 40a. For example, the physical button 540 is selected by the user. In response to this, the MCU in the remote control 50 establishes a correspondence between the physical button 540 and the television 40n, in other words, the physical button 540 is used as a shortcut key of the television 40n. Similarly, based on a user input, the MCU in the remote control 50 may establish a correspondence between the physical button 520 and the television 40a and a correspondence between the physical button 530 and the television 40b. In response to that the NFC coil in the remote control 50 receives the radio frequency signal from the mobile phone 30 and the user selects the physical button 540, the MCU in the remote control 50 may control, by using the NFC control unit, the NFC coil to send the device information of the television 40n to the mobile phone 30.

It should be noted that each of the tablet computer 10, the keyboard 20, the mobile phone 30, the television 40, and the remote control 50 in this embodiment may be replaced with any one of the following devices: a portable or mobile device, a mobile phone, a tablet computer, a television, a personal digital assistant, a laptop device, a desktop computer, a handheld PC, a server, a network device, a graphics device, a video game device, a set-top box, a cellular phone, a portable media player, a handheld device, a wearable device (for example, display glasses or goggles, a head-mounted display, a watch, or a head-mounted device), a virtual reality device and/or an augmented reality device, an internet of things device, an industrial control device, an automotive infotainment device, a streaming media client device, an ebook, a reading device, a POS terminal, and other devices. In addition, the keyboard 20 or the remote control 50 may alternatively be replaced with any one of the following devices: a mouse, a dock, a router, a headphone, a compact disc drive, a USB (Universal Serial Bus) flash drive, and other devices. Herein, the tablet computer 10, the television 40, and an alternative device thereof that have the structure described in the embodiment may be referred to as a host device; the keyboard 20, the remote control 50, and an alternative device thereof that have the structure described in the embodiment may be referred to as an accessory device; and the mobile phone 30 and an alternative device thereof that have the structure described in the embodiment may be referred to as a terminal device. The accessory device may assist in implementing a function of the host device.

In this embodiment of this application, device information of the host device in the accessory device may be randomly updated according to a user requirement. However, in the conventional technology, information about an NFC tag posted on a surface of the host device is written before delivery, and cannot be updated by the user. This embodiment of this application can greatly improve user experience.

Further, in this embodiment of the application, the host device sends the device information of the host device to the accessory device that is disposed separately from the host device in space. In this way, when the terminal device is relatively far away from the host device and is relatively close to the accessory device, for example, when the terminal device and the accessory device are located in a different room from the host device, the terminal device may obtain the device information of the host device by using the accessory device. Compared with the conventional technology, this can extend a distance of obtaining the device information of the host device, and can also improve user experience.

Further, in this embodiment of this application, the terminal device may obtain device information of a plurality of host devices by using the accessory device, so that the user can manage and use the device information of the plurality of host devices.

Further, in this embodiment of this application, in the accessory device, an NFC communications module may not need to be posted on the surface of the host device by using an amplification circuit unit, but may be placed inside the accessory device. This can improve aesthetics and make the NFC communications module not easily damaged.

Figure 5A:
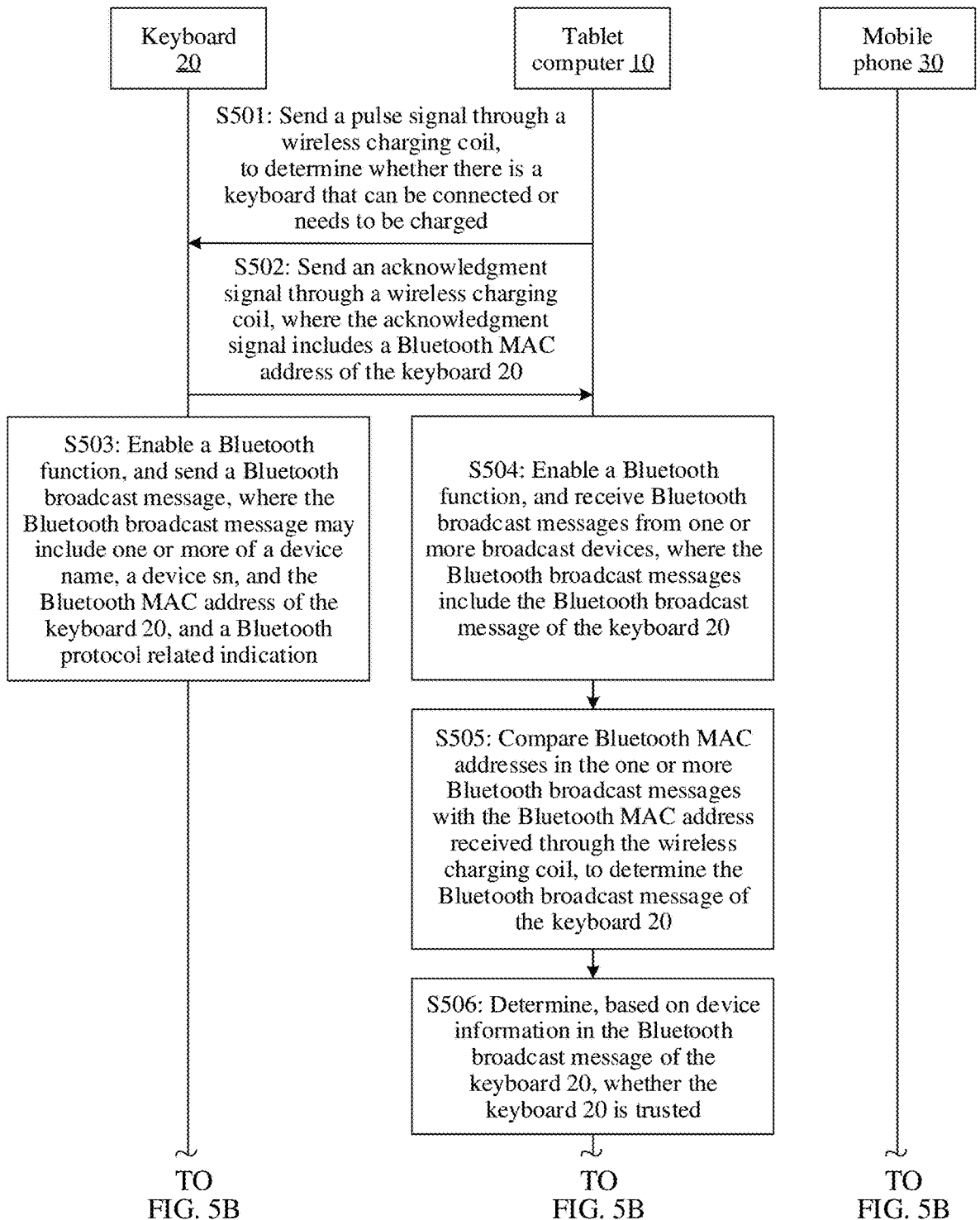
FIG. 5A and FIG. 5B are a schematic flowchart of a method for data transmission between a tablet computer, a keyboard, and a mobile phone according to an embodiment of this application.
Figure 5B:
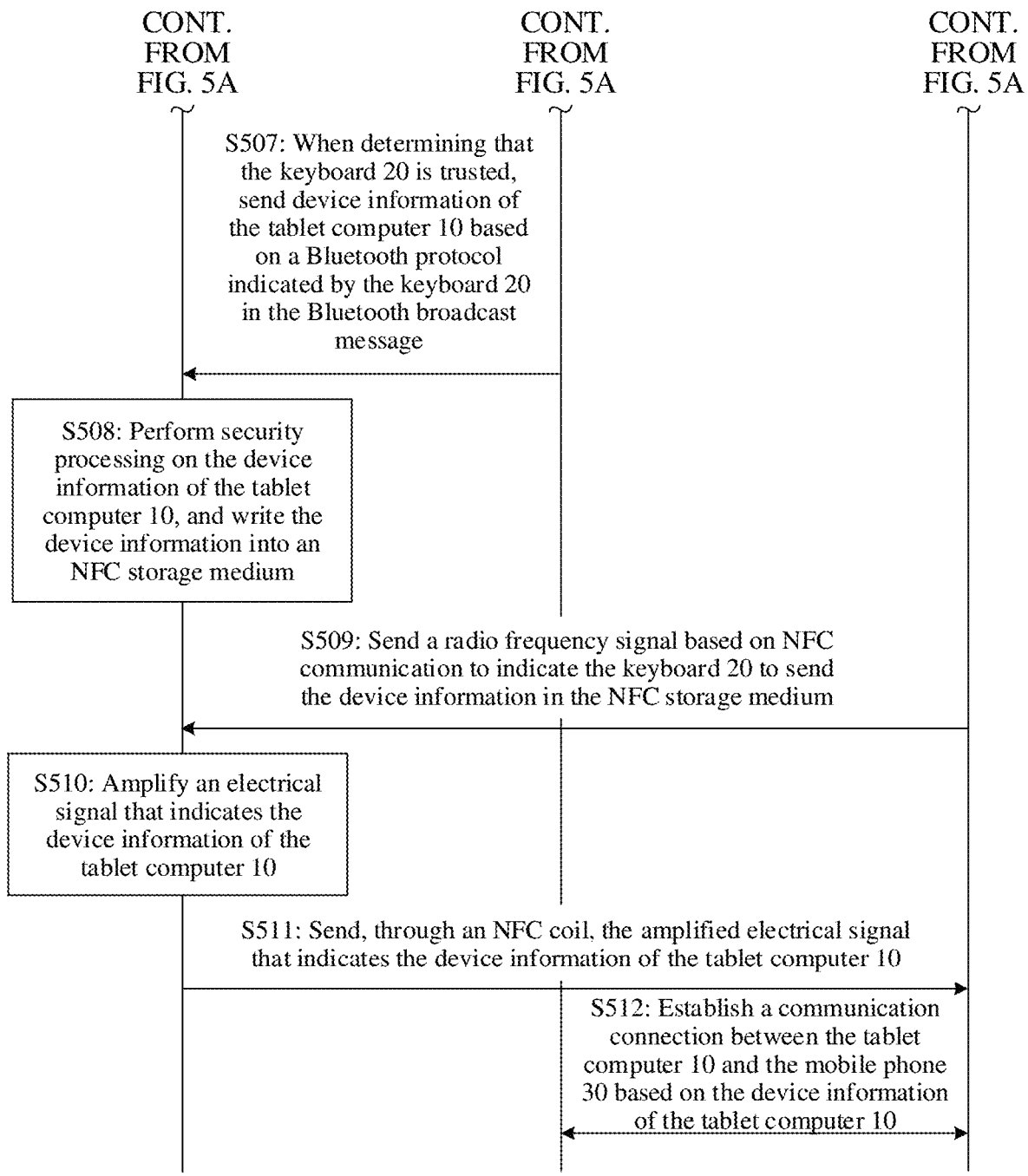

FIG. 5A and FIG. 5B are a schematic flowchart of a method for data transmission between a tablet computer, a keyboard, and a mobile phone according to an embodiment of the present invention. Different modules in the tablet computer 10, the keyboard 20, and the mobile phone 30 in FIG. 1 may implement different blocks or other parts of the method. For content that is not described in the foregoing apparatus embodiment, refer to the following method embodiment. Similarly, for content that is not described in the method embodiment, refer to the foregoing apparatus embodiment. As shown in FIG. 5A and FIG. 5B, the method for data transmission between the tablet computer, the keyboard, and the mobile phone may include the following steps.

S501: The tablet computer 10 sends a pulse signal to the keyboard 20 through the wireless charging coil 122, where the pulse signal may be used by the tablet computer 10 to determine whether there is a keyboard that can be connected or needs to be charged.

When resonance frequencies of the wireless charging coil 122 in the tablet computer 10 and the wireless charging coil 222 in the keyboard 20 are the same, and when the tablet computer 10 and the keyboard 20 mutually approach (for example but not limited to, touch), the wireless charging coil 122 in the tablet computer 10 and the wireless charging coil 222 in the keyboard 20 may exchange energy based on a magnetic resonance effect. Therefore, the tablet computer 10 and the keyboard 20 may perform wireless communication, and the tablet computer 10 may also wirelessly charge the keyboard 20 based on the magnetic resonance effect.

S502: In response to receiving the pulse signal, the keyboard 20 sends an acknowledgment signal to the tablet computer 10 through the wireless charging coil 222, where the acknowledgment signal may include a Bluetooth MAC address of the keyboard 20, and may further include configuration information related to charging power.

S503: In response to sending the acknowledgment signal to the tablet computer 10, the keyboard 20 enables a Bluetooth function, and sends a Bluetooth broadcast message, where the Bluetooth broadcast message is used to enable the tablet computer 10 to determine whether the keyboard 20 is trusted and determine a to-be-used Bluetooth protocol, and may include one or more of a device name, a device SN, and the Bluetooth MAC address of the keyboard 20, and a Bluetooth protocol related indication such as a Bluetooth GATT service related indication a. In another example, regardless of whether the keyboard 20 sends an acknowledgment signal to the tablet computer 10, the keyboard 20 may send a Bluetooth broadcast message.

S504: In response to receiving the acknowledgment signal, the tablet computer 10 enables a Bluetooth function, and receives Bluetooth broadcast messages from one or more broadcast devices, where the one or more broadcast devices include the keyboard 20, and the Bluetooth broadcast messages each may include one or more of a device name, a device SN, and a Bluetooth MAC address of a broadcast device, and a Bluetooth protocol related indication such as a Bluetooth GATT service related indication.

S505: When the Bluetooth broadcast messages each include the Bluetooth MAC address of the broadcast device, the tablet computer 10 may compare the Bluetooth MAC addresses in the one or more Bluetooth broadcast messages with the Bluetooth MAC address received through the wireless charging coil 122, to determine the Bluetooth broadcast message of the keyboard 20 that performs wireless charging communication with the tablet computer 10.

S506: The tablet computer 10 determines, based on the device information in the Bluetooth broadcast message of the keyboard 20 that performs wireless charging communication with the tablet computer 10, for example, the one or more of the device name, the device SN, and the Bluetooth MAC address of the broadcast device, whether the keyboard 20 that performs wireless charging communication with the tablet computer 10 is trusted. In an example, the tablet computer 10 may compare the device information of the keyboard 20 that performs wireless charging communication with the tablet computer 10 with trusted device information stored in the tablet computer 10, and determines whether the device information of the keyboard 20 that performs wireless charging communication with the tablet computer 10 is included in the trusted device information. The trusted device information includes information about a trusted device of the tablet computer 10, and the trusted device information may be information received from a server or another information source, or may be information burned when the tablet computer 10 is delivered from a factory, or may be information about a device that has communicated with the tablet computer 10. A source of the trusted device information is not limited herein. In another example, the tablet computer 10 may control interaction between the tablet computer 10 and a user, to be specific, display the device information of the keyboard 20 that performs wireless charging communication with the tablet computer 10 to the user, and determine, based on a user input, whether the keyboard 20 that performs wireless charging communication with the tablet computer 10 is trusted.

S507: When determining that the keyboard 20 that performs wireless charging communication with the tablet computer 10 is trusted, for example, when determining that the device information of the keyboard 20 that performs wireless charging communication with the tablet computer 10 is included in the trusted device information or the user input indicates that the keyboard 20 is trusted, the tablet computer 10 sends, according to the Bluetooth protocol such as a Bluetooth GATT service indicated by the keyboard 20 that performs wireless charging communication with the tablet computer 10 in the Bluetooth broadcast message, device information of the tablet computer 10 such as at least one of a MAC address and a device SN to the keyboard 20 that performs wireless charging communication with the tablet computer 10. The device SN may be but is not limited to a device SN randomly generated by the control module 11, and the random device SN can improve security of communication between the tablet computer 10 and the mobile phone 30.

It should be noted that, when determining that the keyboard 20 that performs wireless charging communication with the tablet computer 10 is untrusted, for example, when determining that the device information of the keyboard 20 that performs wireless charging communication with the tablet computer 10 is not included in the trusted device information or the user input indicates that the keyboard 20 that performs wireless charging communication with the tablet computer 10 is untrusted, the tablet computer 10 does not send the device information of the tablet computer 10 such as the at least one of the MAC address and the device SN to the keyboard 20 that performs wireless charging communication with the tablet computer 10.

S508: The keyboard 20 may perform security processing on the device information of the tablet computer 10 and write the device information into the NFC storage medium 2411, where the security processing is, for example but not limited to, encrypting the device information of the tablet computer 10 by using a hash algorithm, to obtain a hash value of the device information of the tablet computer 10, so that the mobile phone 30 can determine whether the device information of the tablet computer 10 is tampered with.

In another example, the keyboard 20 may determine whether the device information of the tablet computer 10 is the same as device information in the NFC storage medium 2411. When determining that the two pieces of device information are different, the keyboard 20 updates the device information in the NFC storage medium 2411 by using the device information of the tablet computer 10; or when determining that the two pieces of device information are the same, the keyboard 20 does not update the device information in the NFC storage medium 2411.

S509: The mobile phone 30 sends a radio frequency signal through NFC communication, where the radio frequency signal indicates the keyboard 20 to send the device information in the NFC storage medium 2411.

S510: When the mobile phone 30 approaches (for example, touches) the keyboard 20, the keyboard 20 receives the radio frequency signal from the mobile phone 30 through the NFC coil 242 and electromagnetic induction. In response to this, the keyboard 20 may amplify, by using an amplification circuit 243, an electrical signal that indicates the device information of the tablet computer 10, so that the NFC coil 242 can send the amplified electrical signal to the mobile phone 30, to extend an NFC communication distance between the keyboard 20 and the mobile phone 30. The electrical signal that indicates the device information of the tablet computer 10 may be obtained through load modulation based on the device information of the tablet computer 10.

S511: The keyboard 20 sends, to the mobile phone 30 through the NFC coil 242, the amplified electrical signal that indicates the device information of the tablet computer 10.

S512: The mobile phone 30 establishes a communication connection to the tablet computer 10 based on the device information of the tablet computer 10, for example, establishes a Bluetooth connection to the tablet computer 10 based on at least one of a Bluetooth MAC address and the device SN of the tablet computer 10, and further establishes a Wi-Fi connection based on the Bluetooth connection.

In another embodiment, the method may not include S505. In addition, in S506, the tablet computer 10 determines specific trusted broadcast devices based on device information in each Bluetooth broadcast message such as the one or more of the device name, the device SN, and the Bluetooth MAC address of the broadcast device. The broadcast devices include the keyboard 20 that performs wireless charging communication with the tablet computer 10. In S507, the tablet computer 10 sends the device information of the tablet computer 10 such as the at least one of the MAC address and the device SN to each trusted broadcast device according to a Bluetooth protocol such as a Bluetooth GATT service indicated by each trusted broadcast device in the Bluetooth broadcast message of the trusted broadcast device. The device SN may be but is not limited to a randomly generated device SN, and the random device SN can improve security of communication between the tablet computer 10 and the mobile phone 30. The trusted broadcast devices may include the keyboard 20 that performs wireless charging communication with the tablet computer 10.

In the embodiment, two communication modes are used between the tablet computer 10 and the keyboard 20, so that communication security can be improved. Further, in response to receiving the Bluetooth MAC address of the keyboard 20 through wireless charging communication, the Bluetooth function of the tablet computer 10 is triggered to be enabled, so that various operations required by the user to manually enable the Bluetooth function of the tablet computer 10 can be avoided. In addition, in response to sending the Bluetooth MAC address of the keyboard 20 to the tablet computer 10 through wireless charging communication, the Bluetooth function of the keyboard 20 is triggered to be enabled, so that various operations required by the user to manually enable the Bluetooth function of the keyboard 20 can be avoided. Moreover, a message from the auxiliary device 20 is received through short-distance communication such as wireless charging communication, to trigger a long-distance communication mode between the tablet computer 10 and the auxiliary device 20, so that a communication distance between the tablet computer 10 and the auxiliary device 20 can be extended, and the tablet computer 10 and the auxiliary device 20 do not need to be limited to a short-distance communication range.

It should be noted that wireless charging communication between the tablet computer 10 and the keyboard 20 may be replaced with another communication mode, Bluetooth communication may also be replaced with another communication mode, and even both wireless charging communication and Bluetooth communication may be replaced with another communication mode. The another communication mode may be a combination of one or more of cellular mobile communication, Wi-Fi communication, direct-connection communication (USB connection-based communication, Pogopin connection-based communication, or the like), NFC communication, wireless charging communication, and Bluetooth communication. In other words, the tablet computer 10 may establish a communication connection to the keyboard 20 in any proper communication mode, receive the device information of the keyboard 20 based on the communication connection, and send the device information of the tablet computer 10 to the keyboard 20 when determining, based on the device information of the keyboard 20, that the keyboard 20 is trusted. It should be noted that the communication modes include broadcast communication performed before each communication connection is established.

Figure 6:
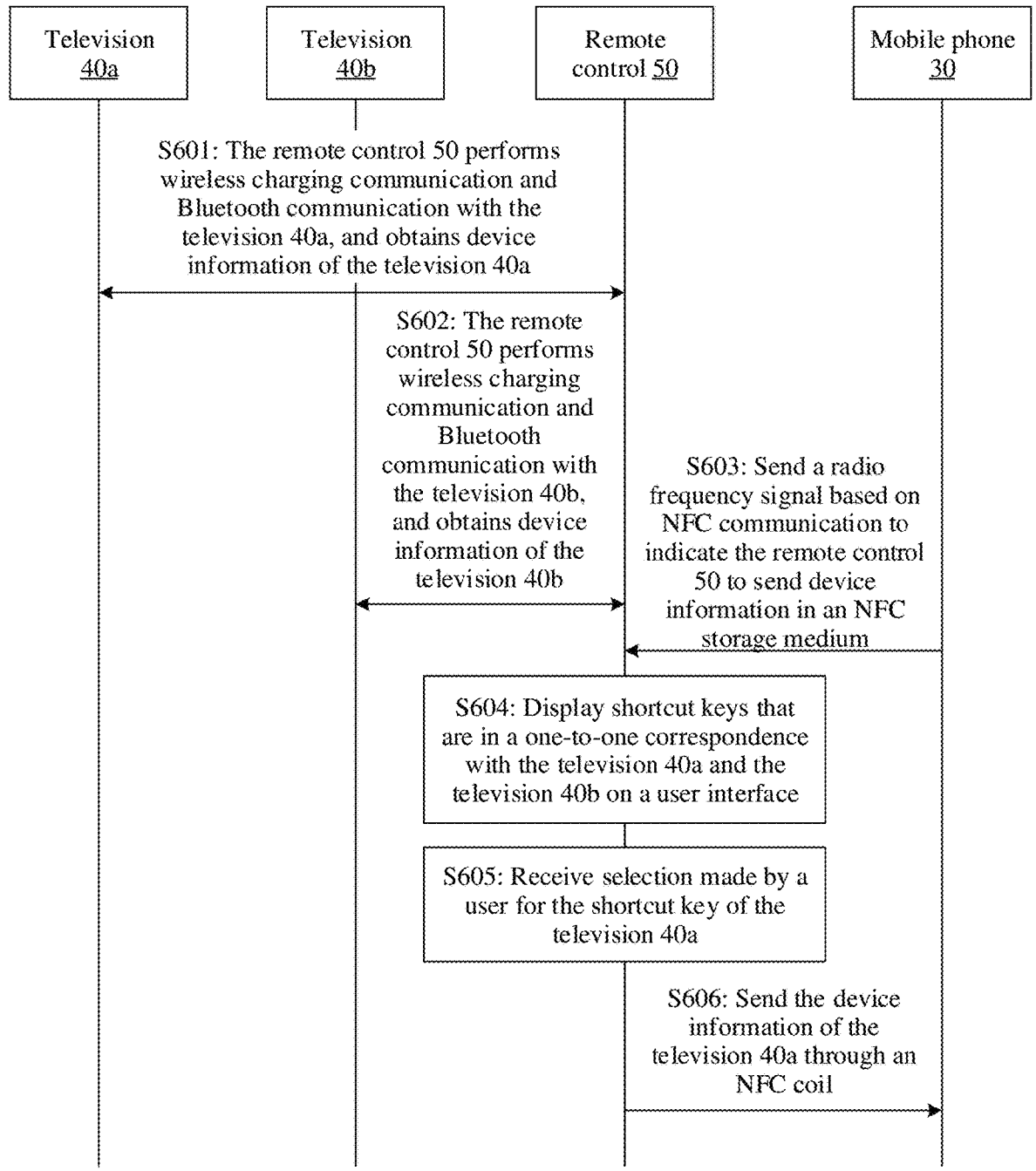
FIG. 6 is a schematic flowchart of data transmission between a plurality of televisions, a remote control, and a mobile phone according to an embodiment of this application.

FIG. 6 is a schematic flowchart of a method for data transmission between a plurality of televisions, a remote control, and a mobile phone according to an embodiment of the present invention. Different modules in the mobile phone 30, the television 40, and the remote control 50 in FIG. 2 may implement different blocks or other parts of the method. For content that is not described in the foregoing apparatus embodiment, refer to the following method embodiment. Similarly, for content that is not described in the method embodiment, refer to the foregoing apparatus embodiment. As shown in FIG. 6, the method for data transmission between the plurality of televisions, the remote control, and the mobile phone may include the following steps.

S601 and S602: The remote control 50 performs wireless charging communication and Bluetooth communication with the television 40a and the television 40b respectively, and obtains device information of the television 40a and the television 40b. For a specific process, refer to the descriptions of the tablet computer 10 and the keyboard 20 in FIG.

5A and FIG. 5B. The television 40a and the television 40b perform a same block as the tablet computer 10, and the remote control 50 performs a same block as the keyboard 20. Details are not described herein again.

S603: When the mobile phone 30 approaches the remote control 50, the remote control 50 receives, through the NFC coil and electromagnetic induction, a radio frequency signal sent by the mobile phone 30, where the radio frequency signal is used to indicate the keyboard 20 to send device information in the NFC storage medium.

S604: The remote control 50 displays shortcut keys that are in a one-to-one correspondence with the television 40a and the television 40b on the user interface, for example, the shortcut keys 511 and 512 shown in FIG. 3.

S605: The remote control 50 receives, through the user interface, selection made by a user for the shortcut key 511 of the television 40a.

In another example, the remote control 50 receives, through the user interface, selection made by the user for the shortcut key 512 of the television 40b.

S606: In response to a user input, the remote control 50 sends the device information of the television 40a to the mobile phone 30 through the NFC coil.

In another example, in response to the user input, the remote control 50 sends the device information of the television 40b to the mobile phone 30 through the NFC coil.

It should be noted that, in the data transmission method in the embodiment, the television 40a and the television 40b are merely used as examples, and there may be any other quantity of televisions 40 in the data transmission method.

Figure 7:
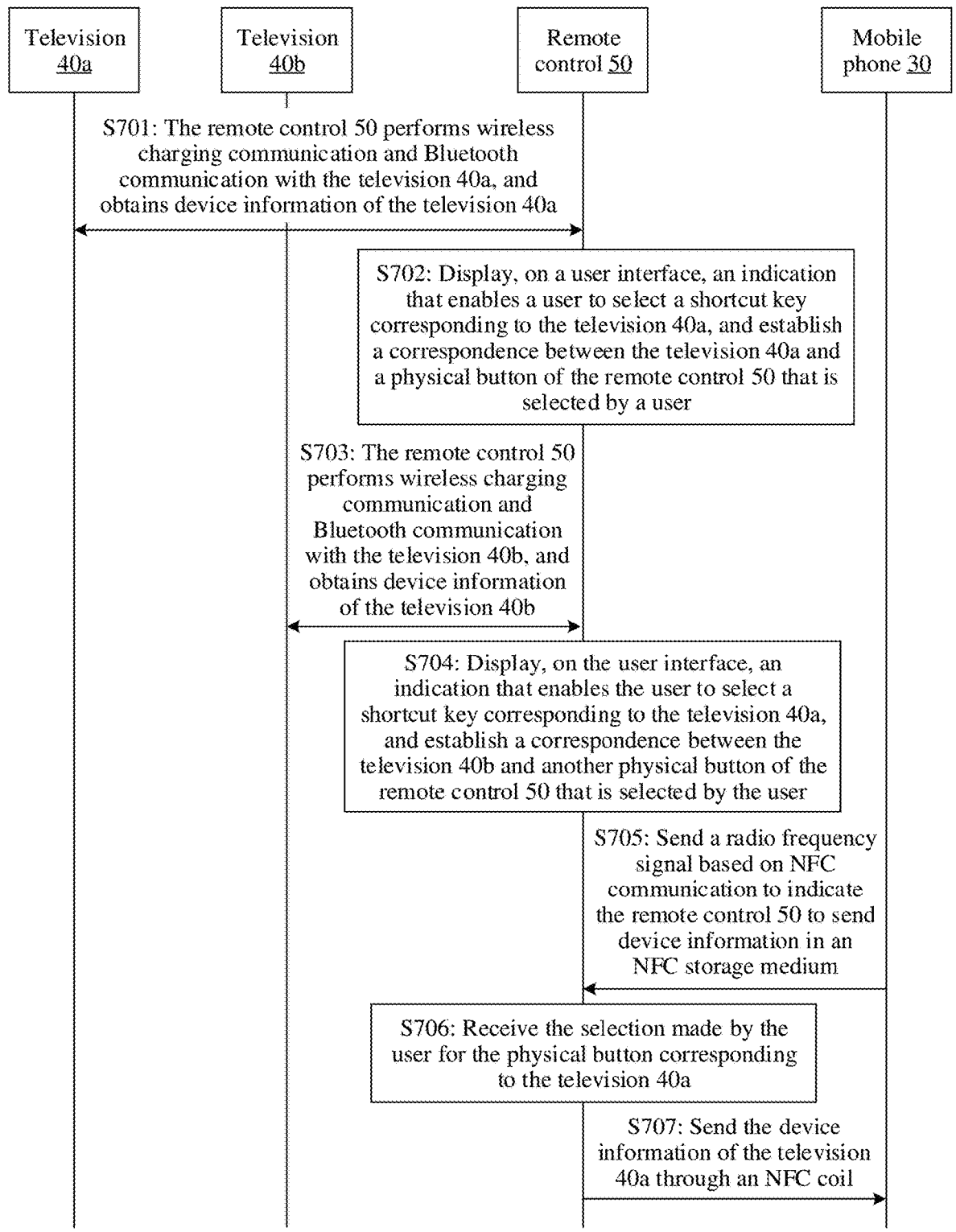
FIG. 7 is another schematic flowchart of data transmission between a plurality of televisions, a remote control, and a mobile phone according to an embodiment of this application.

FIG. 7 is another schematic flowchart of a method for data transmission between a plurality of televisions, a remote control, and a mobile phone according to an embodiment of the present invention. Different modules in the mobile phone 30, the television 40, and the remote control 50 in FIG. 2 may implement different blocks or other parts of the method. For content that is not described in the foregoing apparatus embodiment, refer to the following method embodiment. Similarly, for content that is not described in the method embodiment, refer to the foregoing apparatus embodiment. As shown in FIG. 7, the method for data transmission between the plurality of televisions, the remote control, and the mobile phone may include the following steps.

S701: The remote control 50 performs wireless charging communication and Bluetooth communication with the television 40a, and obtains device information of the television 40a. For a specific process, refer to the descriptions of the tablet computer 10 and the keyboard 20 in FIG. 5A and FIG. 5B. The television 40a performs a same block as the tablet computer 10, and the remote control 50 performs a same block as the keyboard 20. Details are not described herein again.

S702: The remote control 50 displays, on the user interface, an indication that enables a user to select a shortcut key corresponding to the television 40a, for example, the indication 514 in FIG. 4, and establishes a correspondence between the television 40a and a physical button (for example, the button 520 in FIG. 4) of the remote control 50 that is selected by the user.

S703: The remote control 50 communicates with the television 40b, and obtains device information of the television 40b. For a specific process, refer to the descriptions of the tablet computer 10 and the keyboard 20 in FIG. 5A and FIG. 5B. The television 40b performs a same block as the tablet computer 10, and the remote control 50 performs a same block as the keyboard 20. Details are not described herein again.

S704: The remote control 50 displays, on the user interface, an indication that enables the user to select a shortcut key corresponding to the television 40b, and establishes a correspondence between the television 40b and another physical button (for example, the button 530 in FIG. 4) of the remote control 50 that is selected by the user.

S705: When the mobile phone 30 approaches the remote control 50, the remote control 50 receives, through the NFC coil based on electromagnetic induction, a radio frequency signal sent by the mobile phone 30, where the radio frequency signal is used to indicate the remote control 50 to send device information in the NFC storage medium.

S706: The remote control 50 receives the selection made by the user for a physical button corresponding to the television 40a, for example, selection for 520 in FIG. 4.

In another example, the remote control 50 receives selection made by the user for a physical button corresponding to the television 40b, for example, selection for 530 in FIG. 4.

S707: The remote control 50 sends the device information of the television 40a to the mobile phone 30 through the NFC coil.

In another example, the remote control 50 sends the device information of the television 40b to the mobile phone 30 through the NFC coil.

It should be noted that, in the data transmission method in the embodiment, the television 40a and the television 40b are merely used as examples, and there may be any other quantity of televisions 40 in the data transmission method.

It should be noted that each of the tablet computer 10, the keyboard 20, the mobile phone 30, the television 40, and the remote control 50 in this embodiment may be replaced with any one of the following devices: a portable or mobile device, a mobile phone, a tablet computer, a television, a personal digital assistant, a laptop device, a desktop computer, a handheld PC, a server, a network device, a graphics device, a video game device, a set-top box, a cellular phone, a portable media player, a handheld device, a wearable device (for example, display glasses or goggles, a head-mounted display, a watch, or a head-mounted device), a virtual reality device and/or an augmented reality device, an internet of things device, an industrial control device, an automotive infotainment device, a streaming media client device, an ebook, a reading device, a POS terminal, and other devices. In addition, the keyboard 20 or the remote control 50 may alternatively be replaced with any one of the following devices: a mouse, a dock, a router, a headphone, a compact disc drive, a USB (Universal Serial Bus) flash drive, and other devices. Herein, the tablet computer 10, the television 40, and an alternative device thereof that have the structure described in the embodiment may be referred to as a host device; the keyboard 20, the remote control 50, and an alternative device thereof that have the structure described in the embodiment may be referred to as an accessory device; and the mobile phone 30 and an alternative device thereof that have the structure described in the embodiment may be referred to as a terminal device. The accessory device may assist in implementing a function of the host device.

In this embodiment of this application, device information of the host device in the accessory device may be randomly updated according to a user requirement. However, in the conventional technology, information about an NFC tag posted on a surface of the host device is written before delivery, and cannot be updated by the user. This embodiment of this application can greatly improve user experience.

Further, in this embodiment of the application, the host device sends the device information of the host device to the accessory device that is disposed separately from the host device in space. In this way, when the terminal device is relatively far away from the host device and is relatively close to the accessory device, for example, when the terminal device and the accessory device are located in a different room from the host device, the terminal device may obtain the device information of the host device by using the accessory device. Compared with the conventional technology, this can extend a distance of obtaining the device information of the host device, and can also improve user experience.

Further, in this embodiment of this application, the terminal device may obtain device information of a plurality of host devices by using the accessory device, so that the user can manage and use the device information of the plurality of host devices.

Further, in this embodiment of this application, in the accessory device, an NFC communications module may not need to be posted on the surface of the host device by using an amplification circuit unit, but may be placed inside the accessory device. This can improve aesthetics and make the NFC communications module not easily damaged.

Figure 8:
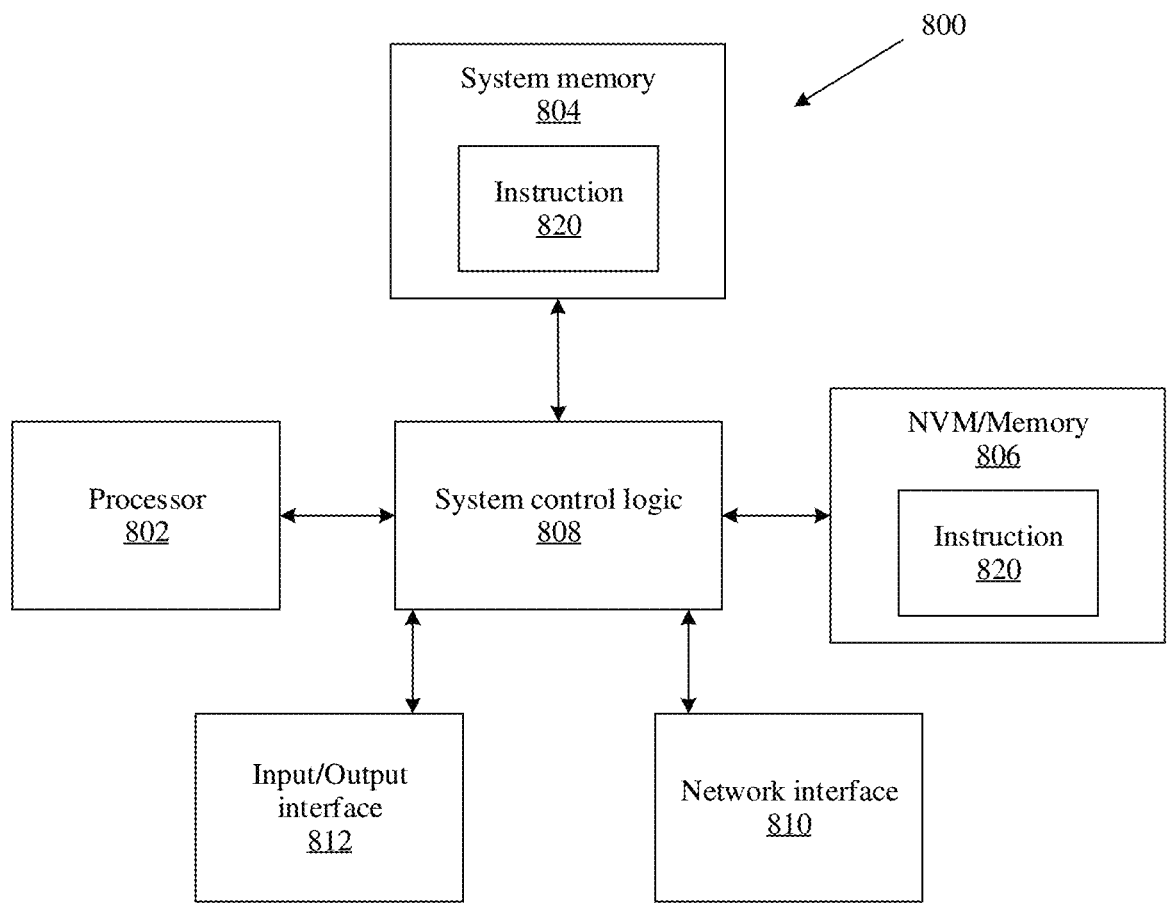
FIG. 8 is a schematic diagram of a structure of a data transmission apparatus according to an embodiment of this application.

FIG. 8 is a schematic diagram of a structure of a data transmission apparatus 800 according to an embodiment of this application. The data transmission apparatus 800 may be the tablet computer or the keyboard in the foregoing embodiment. The apparatus 800 may include one or more processors 802, a system control logic 808 connected to at least one of the processors 802, a system memory 804 connected to the system control logic 808, a nonvolatile memory (NVM) 806 connected to the system control logic 808, and a network interface 810 connected to the system control logic 808.

The processor 802 may include one or more single-core or multi-core processors. The processor 802 may include any combination of a general-purpose processor and a special-purpose processor (for example, a graphics processor, an application processor, or a baseband processor). In this embodiment of this application, the processor 802 may be configured to perform one or more of embodiments shown in FIG. 6 to FIG. 9.

In some embodiments, the system control logic 808 may include any proper interface controller, to provide any proper interface for the at least one of the processors 802 and/or any proper device or component that communicates with the system control logic 808.

In some embodiments, the system control logic 808 may include one or more memory controllers, to provide an interface that connects to the system memory 804. The system memory 804 may be configured to load and store data and/or instructions. In some embodiments, the memory 804 in the apparatus 800 may include any proper volatile memory, for example, a proper dynamic random access memory (DRAM).

The NVM/memory 806 may include one or more tangible, non-transitory computer-readable media that are configured to store data and/or instructions. In some embodiments, the NVM/memory 806 may include any proper nonvolatile memory such as a flash memory and/or any proper nonvolatile storage device such as at least one of a hard disk drive (HDD), a compact disc (CD) drive, and a digital versatile disc (DVD) drive.

The NVM/memory 806 may include a part of storage resources installed on the apparatus 800, or may be accessed by a device, but is not necessarily a part of the device. For example, the NVM/memory 806 may be accessed over a network through the network interface 810.

In particular, the system memory 804 and the NVM/memory 806 may respectively include a temporary copy and a permanent copy of an instruction 820. The instruction 820 may include an instruction executed by the at least one of the processors 802 to enable the apparatus 800 to implement the methods shown in FIG. 3 and FIG. 4. In some embodiments, the instruction 820, hardware, firmware, and/or software components thereof may be additionally/alternatively placed in the system control logic 808, the network interface 810, and/or the processor 802.

The network interface 810 may include a transceiver. The transceiver is configured to provide a radio interface for the apparatus 800 to communicate with any other proper device (for example, a front-end module or an antenna) over one or more networks. In some embodiments, the network interface 810 may be integrated into another component in the apparatus 800. For example, the network interface 810 may integrate into at least one of the processor 802, the system memory 804, the NVM/memory 806, and a firmware device (not shown) having instructions. When the at least one of the processors 802 execute the instructions, the apparatus 800 implements one or more of embodiments shown in FIG. 3 to FIG. 6. Communications module The network interface 810 may further include any proper hardware and/or firmware, to provide a multiple-input multiple-output radio interface. For example, the network interface 810 may be a network adapter, a wireless network adapter, a phone modem, and/or a wireless modem.

In an embodiment, at least one of the processors 802 may be packaged with logic of one or more controllers used for the system control logic 808, to form a system in package (SiP). In an embodiment, at least one of the processors 802 may be integrated on a same tube core with logic of one or more controllers used for the system control logic 808, to form a system on a chip (SoC).

The apparatus 800 may further include an input/output (I/O) interface 812. The I/O interface 812 may include a user interface, so that a user can interact with the apparatus 800. A design of a peripheral component interface also enables a peripheral component to interact with the apparatus 800. In some embodiments, the apparatus 800 further includes a sensor. The sensor is configured to determine at least one of an environmental condition and position information that are related to the apparatus 800.

In some embodiments, the user interface may include but is not limited to a display (for example, a liquid crystal display or a touchscreen display), a speaker, a microphone, one or more cameras (for example, a still image camera and/or a video camera), a flashlight (for example, a light emitting diode flashlight), and a keyboard.

In some embodiments, the peripheral component interface may include but is not limited to a nonvolatile memory port, an audio jack, and a charging port.

In some embodiments, the sensor may include but is not limited to a gyroscope sensor, an accelerometer, a proximity sensor, an ambient light sensor, and a positioning unit. The positioning unit may alternatively be a part of the network interface 810, or may interact with the network interface 810, to communicate with a component (for example, a global positioning system (GPS) satellite) of a positioning network.

Although this application is described with reference to example embodiments, this does not mean that features of the present invention are limited to the implementations. On the contrary, a purpose of describing the present invention with reference to the implementations is to cover other selections or modifications that may be derived based on the claims of this application. To provide an in-depth understanding of this application, the following descriptions include a plurality of specific details. This application may be alternatively implemented without using these details. In addition, to avoid confusion or blurring the focus of this application, some specific details will be omitted from the description. It should be noted that, when there is no conflict, embodiments in this application and the features in embodiments may be mutually combined.

Furthermore, various operations will be described as a plurality of discrete operations in a manner that is most conducive to understanding illustrative embodiments. However, an order described should not be construed as implying that these operations need to depend on the order. In particular, these operations do not need to be performed in the rendered order.

Unless otherwise stated, terms "contain", "have", and "include" are synonymous. A phrase "A/B" indicates "A or B". A phrase "A and/or B" indicates "(A and B) or (A or B)".

As used herein, a term "module" or "unit" may mean, be, or include: an application-specific integrated circuit (ASIC), an electronic circuit, a (shared, special-purpose, or group) processor and/or a memory that executes one or more software or firmware programs, a composite logic circuit, and/or another proper component that provides the described functions.

In the accompanying drawings, some structure or method features may be shown in a particular arrangement and/or order. However, it should be understood that such a particular arrangement and/or order may not be required. In some embodiments, these features may be arranged in a manner and/or order different from that shown in the illustrative accompanying drawings. In addition, inclusion of the structure or method features in a particular figure does not imply that such features are required in all embodiments, and in some embodiments, these features may not be included or may be combined with other features.

Embodiments of a mechanism disclosed in this application may be implemented in hardware, software, firmware, or a combination of these implementations. Embodiments of this application may be implemented as a computer program or program code executed in a programmable system. The programmable system includes at least one processor, a storage system (including a volatile memory, a nonvolatile memory, and/or a storage element), at least one input device, and at least one output device.

The program code may be configured to input instructions, to perform functions described in this application and generate output information. The output information may be applied to one or more output devices in a known manner. For a purpose of this application, a processing system includes any system having a processor such as a digital signal processor (DSP), a microcontroller, an application-specific integrated circuit (ASIC), or a microprocessor.

The program code may be implemented by using a high-level programming language or an object oriented programming language, to communicate with the processing system. The program code may alternatively be implemented by using an assembly language or a machine language when needed. Actually, the mechanism described in this application is not limited to a scope of any particular programming language. In any case, the language may be a compiled language or an interpretive language.

In some cases, the disclosed embodiments may be implemented by hardware, firmware, software, or any combination thereof. In some cases, one or more aspects of at least some embodiments may be implemented by expressive instructions stored in a computer-readable storage medium. The instructions represent various logic in a processor, and when the instructions are read by a machine, the machine is enabled to manufacture logic for performing the technologies described in this application. These representations referred to as "IP cores" may be stored in a tangible computer-readable storage medium, and provided for a plurality of customers or production facilities for loading into a manufacturing machine that actually manufactures the logic or the processor.

Such a computer-readable storage media may include but is not limited to non-transient tangible arrangements of articles manufactured or formed by machines or devices. The computer-readable storage media includes storage media, for example, a hard disk or any other type of disk including a floppy disk, a compact disc, a compact disc read-only memory (CD-ROM), a compact disc rewritable (CD-RW), or a magneto-optical disc; a semiconductor device, for example, a read-only memory (ROM) such as a random access memory (RAM) including a dynamic random access memory (DRAM) or a static random access memory (SRAM), an erasable programmable read-only memory (EPROM), a flash memory, or an electrically erasable programmable read-only memory (EEPROM); a phase change memory (PCM); a magnetic card or an optical card; or any other type of proper medium for storing electronic instructions.

Therefore, embodiments of this application further include a non-transient computer-readable storage medium. The medium includes instructions or design data, for example, a hardware description language (HDL), and defines a structure, a circuit, an apparatus, a processor, and/or a system feature described in this application.

What is claimed is:

1. An accessory device, wherein the accessory device and at least one first device are disposed separately in space, and wherein the accessory device comprises:
    one or more processors;
    a transceiver, configured to communicate with the at least one first device, and obtain device information of the at least one first device using at least a second communication mode different from a near field communication (NFC) communication mode; and
    a memory, wherein the one or more processors is configured to execute program instructions in the memory, the program instructions comprising instructions to:
        write the device information of the at least one first device obtained by the transceiver into an NFC storage medium; and
        when an NFC connection is established between the accessory device and a second device, control the transceiver to send the device information of the at least one first device to the second device.

2. The accessory device according to claim 1, wherein the at least one first device comprises a plurality of devices, the program instructions further includes instructions to:
    establish a one-to-one correspondence between device information of the plurality of devices and shortcut keys of the accessory device; and
    control, based on shortcut key selection made by a user, the transceiver to send device information of a first device corresponding to a shortcut key selected by the user to the second device.

3. The accessory device according to claim 1, wherein the transceiver being configured to communicate with the at least one first device, and to obtain the device information of the at least one first device, comprises the transceiver being configured to:
- send a media access control (MAC) address of the accessory device to the at least one first device in a first communication mode; and
- send at least one of a device name or a device serial number of the accessory device to the at least one first device in the second communication mode, and receive the device information of the at least one first device from the at least one first device.

4. The accessory device according to claim 3, wherein the first communication mode comprises a wireless charging communication mode or an NFC communication mode, and the second communication mode comprises a Bluetooth communication mode.

5. The accessory device according to claim 3, wherein the first communication mode or the second communication mode comprises at least one of wireless charging communication, Bluetooth communication, cellular mobile communication, wireless fidelity (Wi-Fi) communication, universal serial bus (USB) connection-based communication, Pogopin connection-based communication, or NFC communication.

6. The accessory device according to claim 1, further comprising:
- an amplification circuit, configured to amplify an electrical signal that indicates the device information of the first device; and
- wherein the transceiver is configured to send the amplified electrical signal to the second device.

7. The accessory device according to claim 1, wherein the program instructions further include instructions to:
- encrypt the device information of the at least one first device obtained by the transceiver, and write encrypted device information of the at least one first device into the NFC storage medium.

8. The accessory device according to claim 1, wherein the device information of the first device comprises at least one of a MAC address of the first device or a device serial number of the first device.

9. A first device, wherein the first device and an accessory device are disposed separately in space, and wherein the first device comprises:
- a transceiver, configured to communicate with the accessory device;
- one or more processors; and
- a memory, wherein the one or more processors is configured to execute program instructions in the memory, the program instructions including instructions to:
  - control the transceiver to send device information of the first device to the accessory device using at least a second communication mode different from a near field communication (NFC) communication mode, wherein the device information of the first device is used to establish communication between the first device and a second device.

10. The first device according to claim 9, wherein the transceiver being configured to communicate with the accessory device comprises the transceiver being configured to:
- receive a media access control (MAC) address of the accessory device from the accessory device in a first communication mode;
- enable the second communication mode in response to receiving the MAC address of the accessory device; and
- receive at least one of a device name or a device serial number from the accessory device in the second communication mode.

11. The first device according to claim 10, wherein the transceiver being configured to communicate with the accessory device further comprises the transceiver being configured to:
- when the MAC address of the accessory device received in the first communication mode is at least partially the same as a MAC address of the accessory device received in the second communication mode, send the device information of the first device to the accessory device in the second communication mode.

12. The first device according to claim 10, wherein the first communication mode comprises a wireless charging communication mode or an NFC communication mode, and the second communication mode comprises a Bluetooth communication mode.

13. The first device according to claim 10, wherein the first communication mode or the second communication mode comprises at least one of wireless charging communication, Bluetooth communication, cellular mobile communication, wireless fidelity (Wi-Fi) communication, universal serial bus (USB) connection-based communication, Pogopin connection-based communication, or NFC communication.

14. The first device according to claim 9, wherein the device information of the first device comprises at least one of a MAC address or a device serial number.

15. A system, comprising:
- an accessory device; and
- at least one first device, configured to:
  - communicate with the accessory device; and
  - send device information of the at least one first device to the accessory device using at least a second communication mode different from a near field communication (NFC) communication mode, wherein the device information of the at least one first device is used to establish communication between the at least one first device and a second device; and
- wherein the accessory device is configured to:
  - receive the device information of the at least one first device;
  - write the device information of the at least one first device into an NFC storage medium; and
  - when an NFC connection is established between the accessory device and the second device, send the device information of the at least one first device to the second device.

16. The system according to claim 15, wherein the at least one first device comprises a plurality of devices, and the accessory device is further configured to:
- establish a one-to-one correspondence between device information of the plurality of devices and shortcut keys of the accessory device; and
- send, based on shortcut key selection made by a user, device information of a first device corresponding to a shortcut key selected by the user to the second device.

17. The system according to claim 15, wherein the accessory device is configured to:
- send a media access control (MAC) address of the accessory device to the at least one first device in a first communication mode; and
- send at least one of a device name or a device serial number of the accessory device to the at least one first device in the second communication mode, and receive the device information of the at least one first device from the at least one first device.

18. The system according to claim 17, wherein the first communication mode comprises a wireless charging communication mode or an NFC communication mode, and the second communication mode comprises a Bluetooth communication mode.

19. The system according to claim 17, wherein the first communication mode or the second communication mode comprises at least one of wireless charging communication, Bluetooth communication, cellular mobile communication, wireless fidelity (Wi-Fi) communication, universal serial bus (USB) connection-based communication, Pogopin connection-based communication, or NFC communication.

20. The system according to claim 17, wherein the accessory device is configured to:
    amplify an electrical signal of the device information of the first device and send the amplified electrical signal to the second device.

* * * * *